United States Patent [19]

Emery

[11] Patent Number: 4,941,337
[45] Date of Patent: Jul. 17, 1990

[54] METHOD OF MAKING THREADED FASTENERS

[75] Inventor: Ralph S. Emery, Bridgnorth, Great Britain

[73] Assignee: Austin Rover Group Limited, United Kingdom

[21] Appl. No.: 375,145

[22] Filed: Jun. 30, 1989

[30] Foreign Application Priority Data

Jul. 11, 1988 [GB] United Kingdom ............... 8816444

[51] Int. Cl.$^5$ .................... B21H 3/02; B21K 1/46; B21K 1/56
[52] U.S. Cl. ........................................ 72/88; 10/27 R
[58] Field of Search ............... 10/27 R, 141 H; 72/88, 72/90; 411/392, 399, 412, 413, 424

[56] References Cited

U.S. PATENT DOCUMENTS

| | | | |
|---|---|---|---|
| 2,895,368 | 7/1959 | Place | 411/399 X |
| 3,966,341 | 6/1976 | Bailey et al. | 411/392 X |
| 4,018,132 | 4/1977 | Abe | 411/413 |
| 4,338,054 | 7/1982 | Dahl | 411/424 |
| 4,786,226 | 11/1988 | Jende | 411/392 |

FOREIGN PATENT DOCUMENTS

| | | | |
|---|---|---|---|
| 0144503 | 6/1985 | European Pat. Off. | 411/399 |
| 3521755 | 12/1986 | Fed. Rep. of Germany | |
| 1392513 | 4/1975 | United Kingdom | |

*Primary Examiner*—E. Michael Combs
*Attorney, Agent, or Firm*—Davis, Bujold & Streck

[57] ABSTRACT

A threaded fastener is made by a method which involves forming a portion having an external thread form and a shank portion. The shank portion has at least one substantially circumferential groove the depth of which is such that the effective stress area thereby produced is less than the minimum effective stress area of the external thread form and is also such that yield of the threaded fastener occurs in use in the region of the or each groove at a predetermined load. The depth of the or each groove may be such that the diameter of the shank portion at the base of the or each groove is in accordance with the relationship:

$$D = \sqrt{\frac{4\sigma}{\pi F}} \times K$$

where
D is the diameter at the base of the or each groove (m)
δ is the tensile strength of the wire (N/m$^2$)
F is the load (N) required to produce yielding of the fastener in the region of the or each groove
K is a constant which is a function of the stress concentration factor appropriate to the shape of the groove and the type and composition of the material used to make the wire.

7 Claims, 2 Drawing Sheets

METHOD OF MAKING THREADED FASTENERS

FIELD OF THE INVENTION

The present invention relates to threaded fasteners and, more particularly but not exclusively to bolts or studs having an external thread form, and to a method of making such fasteners.

DESCRIPTION OF PRIOR ART

It is a problem that when a bolt is tightened into yield the actual clamp load produced is dependent upon the material strength, effective stress area and the torsional stress in the bolt which itself is a function of the thread friction.

When existing bolts such as those described in GB-A-No. 2 187 791 are used the actual clamping load produced on tightening to produce yield will vary and this can lead to failure in the components being clamped or secured together. For example, if the bolts are used to secure a cylinder head to cylinder block insufficient clamping load will result in failure of the cylinder head gasket

OBJECT OF THE INVENTION

It is an object of the present invention to reduce the variation in clamp load produced when a threaded fastener such as a bolt is tightened into yield.

SUMMARY OF THE INVENTION

According to one aspect of the present invention there is provided a threaded fastener including a portion having an external thread form thereon and a shank portion having at least one substantially circumferential groove the depth of which is such that the effective stress area thereby produced is less than the minimum effective stress area of the external thread form and is such that yield of the threaded fastener occurs in use in the region of the or each groove at a predetermined applied load.

Preferably the depth of the or each groove is such that the diameter of the shank at the base of the or each groove is in accordance with the relationship:

$$D = \sqrt{\frac{4\sigma}{\pi F}} \times K$$

where
D is the diameter at the base of the or each groove (m)
δ is the tensile strength of the wire (N/m$^2$)
F is the load (N) required to produce yielding of the fasteners in the region of the or each groove.
K is a constant which is a function of the stress concentration factor appropriate to the shape of the groove and the type and composition of the material used to make the wire.

The constant K can be readily determined by experiment and requires no inventive effort.

Preferably, at least six circumferential grooves are formed in the shank portion.

According to a second aspect of the present invention there is provided a method of making a threaded fastener including the steps of:
drawing from a material of suitable material properties a wire of appropriate diameter;
testing at least a length of the so formed wire to determine the tensile strength thereof;
cutting the wire into blanks of appropriate length according to the desired length of threaded fastener being made;
forming an appropriate external thread form on a portion of each of said blanks; and
forming at least one substantially circumferential groove in a shank portion of each of the blanks the depth of which groove is such that the effective stress area thereby produced is less than the minimum effective stress area of the external thread form and is such that the yield of the threaded fastener being made occurs in use in the region of the or each groove at a predetermined applied load.

Preferably a length of wire is tested from each end of the wire.

The at least one substantially circumferential groove may be formed simultaneously with the external thread form, or may be formed prior to or subsequent to the external thread form.

For a better understanding of the present invention and to show more clearly how it may be carried into effect reference will now be made, by way of example, to the accompanying drawings in which:

DESCRIPTION OF PREFERRED EMBODIMENT

Figures 1, 2:
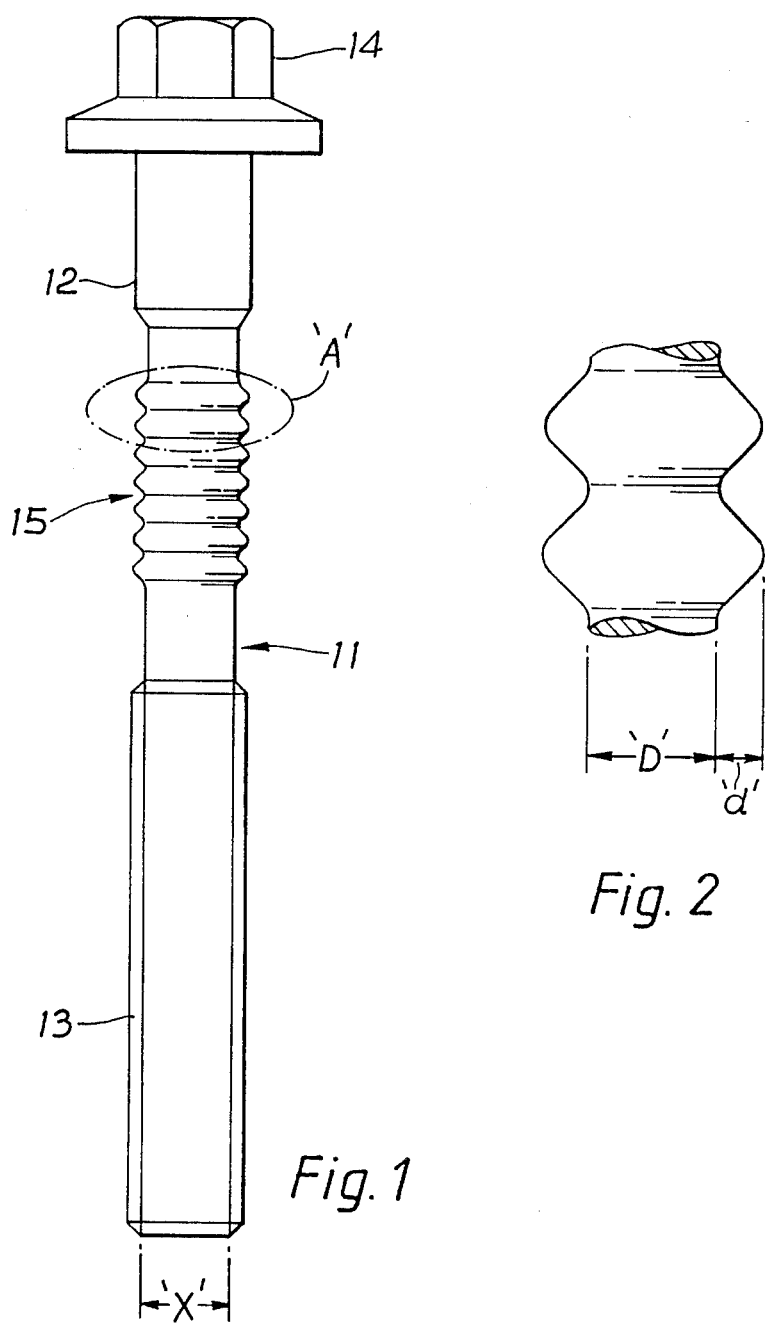
FIG. 1 is a side view of a bolt according to a first aspect of the present invention.
FIG. 2 is an enlarged and exaggerated view of the area 'A' on FIG. 1.

FIGS. 1 and 2 show a threaded fastener in the form of a bolt 11 having a shank 12 and a head 14. The shank 12 has an external thread form 13 near to one end and is terminated by the head 14 on the other end. A portion of the shank 12 towards its juncture with the head 14 has a number of circumferential grooves 15 formed in it to produce a ribbed formation.

The depth 'd' of each of the circumferential grooves 15 is such that the minimum diameter 'D' of the shank 12 in the region of the grooves 15 produces an effective stress area which is less than the effective stress area produced in the region of the thread form 13 by the minimum thread diameter 'X'. The actual dimension 'D' is determined in accordance with the relationship $$D = \sqrt{\frac{4\sigma}{\pi F}} \times K$$

where: D = diameter at the base of each groove (m)
σ = tensile strength of the wire (N/m$^2$)
F = load (N) required to produce yielding of the bolt in the region of the grooves
K = constant which is a function of the stress concentration factor appropriate to the shape of each groove and the type and composition of the material used to make the wire.

By measuring the tensile strength of the wire from which the bolt is to be made it is possible to determine an appropriate value of 'D' to produce yielding at a predetermined clamp force.

It is therefore possible to compensate for slight changes in material strength and thereby reduce the variation in clamp load produced by loading any such bolt into the elastic region.

To produce a bolt according to the invention only small changes are required to conventional threaded fastener manufacturing methods.

Figure 3:
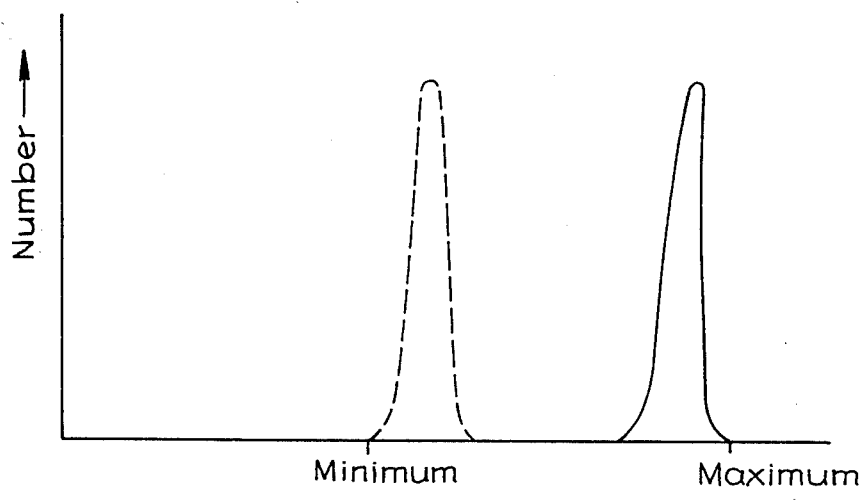
FIG. 3 is a graph illustrating the strength distribution of lengths of wire from a single cast within an overall acceptable range.

The primary manufacturing steps include drawing from a material of suitable properties such as carbon steel a wire appropriate diameter, and testing a short length of the wire to determine its tensile strength at yield. Tests show that while the strength of the wire may vary between minimum and maximum acceptable strengths, the tensile strength at yield of lengths of wire from a single cast fall within a much narrower band. This is shown in FIG. 3 where the strength distribution is typified by a narrow band within the range of acceptable strengths. The test for tensile strength is normally carried out by testing a sample from each end of the wire.

The wire is then cut into blanks of appropriate length according to the length of the bolt being made and each of the blanks then has an appropriate thread form rolled onto it. At the same time as rolling the thread form, or as a separate step, the grooves 15 are produced by rolling, the depth of each groove being controlled to produce an effective stress area that will produce yield of the bolt in use in the region of the grooves at a predetermined applied load.

The number of grooves 15 to be rolled is not critical, but preferably the number of gooves should be at least six, and ideally as many grooves as possible should be formed. A greater number of grooves minimises the risk of stress fractures and allows the bolt to be re-used repeatedly because work hardening in the region of the grooves occurs during removal of the bolt after it has been secured and a larger number of grooves permits the bolt to be removed more times before the region of every groove is work hardened with the result that any further yield will take place in the region of the thread and not in the region of the grooves.

Figure 4:
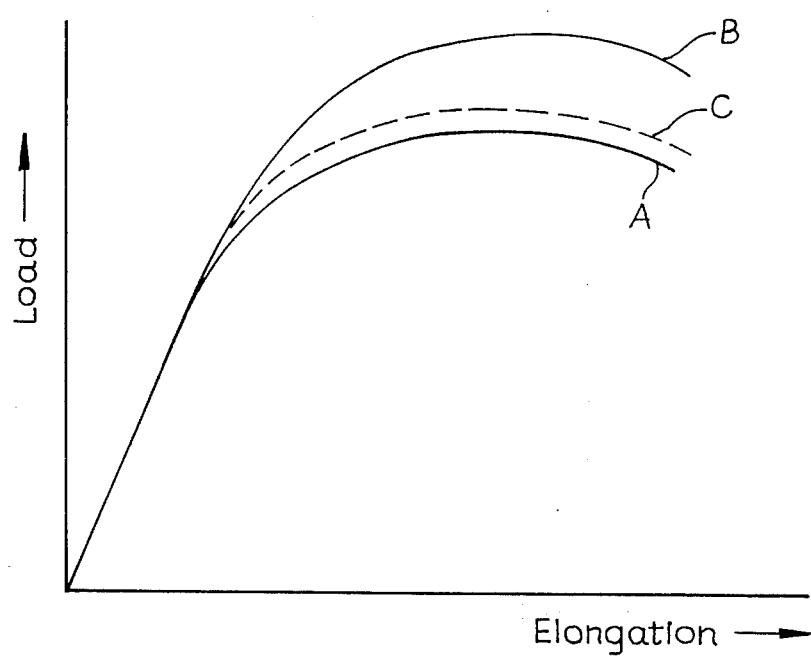
FIG. 4 is a graph showing the elongation of the wire with increasing load.

Not only does the formation of grooves in the bolt permit re-use of the bolt without yield occurring in the thread, but it also enables the overall yield strength of the bolt to be controlled within tighter limits. FIG. 4 is a graph showing the elongation of the wire with increasing load. The bottom curve A shows the behaviour of wire having the minimum acceptable yield strength while the top curve B shows the behaviour of wire having the maximum acceptable yield strength. The intermediate dotted line C shows how a wire having the maximum acceptable yield strength can have grooves rolled thereon so as to reduce the yield strength of the wire close to the minimum acceptable yield strength. The distribution of yield strength for such a grooved wire is also shown in FIG. 3 in a dotted line and explains why the average strength is required to be greater than the minimum strength.

By testing the strength of each batch of wire it is possible to establish the average strength of the wire and thus to determine the depth of groove 'd' to establish a minimum diameter 'D' of the shank of the groove in order to bring the average strength of the wire down to the dotted line C. In this way the tolerance on the yield strength of the wire can be reduced and the variation in clamp load produced when a bolt is tightened into yield can be reduced.

I claim:

1. A method of making a threaded fastener including the steps of:

drawing from a material of suitable material properties a wire of appropriate diameter;

testing at least a length of the so formed wire to determine the tensile strength thereof;

cutting the wire into blanks of appropriate length according to the desired length of threaded fastener being made;

forming an appropriate external thread form on a portion of each of said blanks; and forming at least one substantially circumferential groove in a shank portion of each of the blanks the depth of which groove is dependent upon the tensile strength of the length of wire tested and is such that the effective stress area thereby produced is lens than the minimum effective stress area of the external thread form and is such that the yield of the threaded fastener occurs in use in the region of the or each groove at a predetermined applied load.

2. A method according to claim 1, wherein a length of wire is tested from each end of the wire.

3. A method according to claim 1, wherein the at least one substantially circumferential groove is formed simultaneously with the external thread form.

4. A method according to claim 1, wherein the at least one substantially circumferential groove is formed prior to the external thread form.

5. A method according to claim 1, wherein the at least one substantially circumferential groove is formed subsequent to the external thread form.

6. A method according to claim 1, wherein the depth of the or each groove is such that the diameter of the shank portion at the base of the or each groove is in accordance with the relationship:

$$D = \sqrt{\frac{4\sigma}{\pi F}} \times K$$

where D is the diameter at the base of the or each groove (m)

$\delta$ is the tensile strength of the wire (N/m$^2$)

F is the load (N) required to produce yielding of the fastener in the region of the or each groove.

K is a constant which is a function of the stress concentration factor appropriate to the shape of the groove and the type and composition of the material used to make the wire.

7. A method according to claim 1, wherein at least six circumferential grooves are formed in the shank position.

* * * * *

UNITED STATES PATENT AND TRADEMARK OFFICE
CERTIFICATE OF CORRECTION

PATENT NO.  : 4,941,337

DATED       : July 17, 1990

INVENTOR(S) : Ralph Stewart EMERY

It is certified that error appears in the above-identified patent and that said Letters Patent is hereby corrected as shown below:

Column 4, line 25 change "lens" to "less";

line 53 change "δis" to "σis";

line 60 change "position" to "portion".

Signed and Sealed this

Thirty-first Day of December, 1991

Attest:

HARRY F. MANBECK, JR.

*Attesting Officer*      *Commissioner of Patents and Trademarks*